United States Patent [19]

Venema

[11] Patent Number: 4,550,595
[45] Date of Patent: Nov. 5, 1985

[54] TORQUE MEASUREMENT CIRCUIT AND METHOD

[75] Inventor: Harry J. Venema, Wheaton, Ill.

[73] Assignee: Borg-Warner Corporation, Chicago, Ill.

[21] Appl. No.: 609,601

[22] Filed: May 11, 1984

[51] Int. Cl.⁴ ......................................... G01M 15/00
[52] U.S. Cl. .................................. 73/116; 73/862.19
[58] Field of Search ..................... 73/116, 117.3, 862, 73/862.08, 862.19, 862.28

[56] References Cited

U.S. PATENT DOCUMENTS

| | | | |
|---|---|---|---|
| 3,693,426 | 9/1972 | Little | 73/133 |
| 3,729,989 | 5/1973 | Little | 73/133 R |
| 3,817,092 | 6/1974 | Ludloff | 73/133 R |
| 3,921,446 | 11/1975 | Ludloff | 73/136 R |
| 4,098,242 | 7/1978 | Anderson | 123/102 |
| 4,301,678 | 11/1981 | Full et al. | 73/116 |
| 4,344,140 | 8/1982 | Leung | 364/431.08 |

OTHER PUBLICATIONS

SAE Technical Paper Series 810155 entitled "A Non-Contacting Torque Sensor for the Internal Combustion Engine" by W. B. Ribbens, Date: Feb. 1981—Pertinent pp.: 59 through 67.

Primary Examiner—Jerry W. Myracle
Attorney, Agent, or Firm—James E. Tracy

[57] ABSTRACT

An improved torque measurement circuit and method for an internal combustion engine of the four cylinder, two-cycle type includes synchronous detection circuits and circuits to account for inertia forces due to the mass of the pistons and connecting rods. The synchronous detection circuits multiply a signal directly proportional to torque variations with sine wave and cosine wave signals to produce a synchronous detection signal. A summing circuit is provided to combine the synchronous detection signal with a signal proportional to the square of the angular velocity of the crankshaft of the engine to produce a resultant output signal directly proportional to average torque and independent of speed.

20 Claims, 5 Drawing Figures

TORQUE MEASUREMENT CIRCUIT AND METHOD

BACKGROUND OF THE INVENTION

This invention relates generally to torque measuring apparatus and more particularly, it relates to an improved torque measurement circuit and method for an internal combustion engine of the four cylinder, two-cycle type which cancels an error created by inertia impulse force due to the mass of the pistons and connecting rods.

The need for monitoring and control systems for automotive vehicles has arisen due to recent enactment of stringent laws relating to exhaust pollution-control and safety standards. In order to insure, for example, less exhaust pollution, there is required a more effective and efficient operation of an internal combustion engine. This, in turn, leads to the necessity of monitoring of a number of performance characteristics during the normal operating conditions of an automotive vehicle. Torque measurement is one of the more significant parameters, if it is not the most critical. Thus, accurate measurement of torque must be achieved so that the quantity can be properly correlated to regulate other performance characteristics such as ignition timing, fuel mixture control, transmission control and pollution-emission control.

In U.S. Pat. No. 3,693,426 to Donald R. Little issued on Sept. 26, 1972 and entitled "Portable Useful Horsepower Measuring Instrument", there is disclosed an apparatus for measuring horsepower by detecting and producing a first signal directly proportional to engine RPM or vehicle speed and a second signal directly proportional to an absolute acceleration parallel to the roadway grade. From these two parameters, a resultant signal is calculated to be representative to the useful horsepower and torque.

U.S. Pat. No. 3,729,989 to Donald R. Little issued on May 1, 1973, is quite similar to his earlier U.S. Pat. No. 3,693,426 and further discloses a transducer strain gauge which delivers an analog d.c. signal directly proportional to the force experienced thereon due to the torque produced by a prime mover. A multiplier circuit receives a first input signal directly proportional to the velocity of the prime mover and a second signal being the said analog force signal so as to determine the useful horsepower.

U.S. Pat. No. 3,817,092 to Karl Ludloff issued on June 18, 1974, teaches a method of measuring torque and power of a rotating element in a system by determining angular velocity and angular acceleration at a particular point in time. U.S. Pat. No. 3,921,446 to Karl Ludloff issued on Nov. 25, 1975 represents an improvement over his earlier U.S. Pat. No. 3,817,092 patent and embodies a general purpose torque meter and dynamometer system which includes a computer for receiving a plurality of independent measurements from sensors to detect relevant engine operating parameters such as engine speed, throttle position, engine and air temperatures, and brake-fluid pressure. Thus, this system will be more accurate than his earlier apparatus, which only allowed for a single subtraction for external load losses and internal system losses, due to the fact that the latter system takes into account an average of many measurements for determining torque and/or power.

In U.S. Pat. No. 4,098,242 to George H. Anderson issued July 4, 1978, there is taught an automatic control system which includes a switching circuit for changing the gain of the system in accordance with load conditions of a prime mover such as an internal combustion engine.

In U.S. Pat. No. 4,344,140 to Chun-Keung Leung issued on Aug. 10, 1982, there is disclosed a closed loop engine roughness control for controlling the fuel delivery to an internal combustion engine to maintain the operation of the engine at a predetermined roughness level. The roughness control includes a roughness sensor to detect the instantaneous rotational velocity of the engine's crankshaft to generate an engine roughness signal. This engine roughness signal is multiplied by an engine speed signal to generate a speed corrected roughness signal. The speed corrected roughness signal is summed with a reference signal to produce a bias signal operative to modify the fuel delivery signals generated by a fuel controlled computer. These fuel signals as modified by the bias signal control the fuel delivery to the engine, thereby maintaining the operation of the engine at the predetermined roughness level.

W. B. Ribbens, from the University of Michigan, investigated the use of an inexpensive, non-contacting sensor for the measurement of the quasi-average torque of an internal combustion engine. His method of torque measurement utilizes an inexpensive sensor for directly measuring instantaneous crankshaft angular velocity and relatively simple electronic signal processing to generate a signal proportional to instantaneous crankshaft angular acceleration. The result of Mr. Ribbens' experimental study showing that the desired torque is highly correlated with the relative transformation of crankshaft acceleration is published in S. A. E. Technical Paper Ser. No. 810155 entitled "A Non-Contacting Torque Sensor for the Internal Combustion Engine."

Heretofore, the prior art attempts discussed above measure the torque being transmitted through a rotating shaft by estimating an engine variable which is related to torque such as cylinder instantaneous pressure, manifold pressure, and engine position. However, none of them take into consideration the effect of torque impulses or inertia forces due to the mass of the pistons and connecting rods.

Accordingly, it would be desirable to provide an improved torque measurement circuit and method for an internal combustion engine of the four cylinder, two-cycle type which cancels an error created by inertia impulse force due to the mass of the pistons and connecting rods. The present invention produces an electrical voltage signal directly proportional to torque which is the sum of first and second signals both representative of the pressures inside the cylinders exerting a force on the pistons and of the inertia force due to the mass of the pistons and connecting rods. These two signal components are obtained by means of synchronous detection circuits driven at twice the rotational velocity of the crankshaft of the engine.

SUMMARY OF THE INVENTION

It is a general object of the present invention to provide an improved torque measurement circuit for an internal combustion engine of the four cylinder, two-cycle type.

It is another object of the present invention to provide a method for measuring torque by producing an electrical voltage signal directly proportional to torque which is sum of first and second signals both representative of the pressures inside the cylinders exerting a force on the pistons and of the inertia force due to the mass of the pistons and connecting rods.

It is still another object of the present invention to provide a torque measurement circuit which is responsive to the effect of torque impulses due to the mass of the pistons and connecting rods.

In accordance with these aims and objectives of the present invention, there is provided a torque measurement circuit for an internal combustion engine of the four cylinder, two-cycle type which accounts for pulsating inertia forces due to the mass of the pistons and the connecting rods. The measurement circuit includes pick-up means having an input indicative of the angular displacement of the crankshaft in an internal combustion engine to generate first signals directly proportional to the rotational speed of the crankshaft. The first signal has a portion indicative of when the piston is a top dead-center position. First circuit means is responsive to the first signal for generating second signals directly proportional to the engine's instantaneous rotational velocity. Second circuit means is responsive to the portion of the first signal for generating a sine wave signal at twice the angular displacement of the crankshaft. Third circuit means, also responsive to the portion of the first signal, is provided for generating a third signal directly proportional to the engine's average angular velocity. Fourth circuit means is provided for differentiating the second signal to generate a fourth signal directly proportional to the torque variations of the engine. Fifth circuit means responsive to the sine wave signal is provided for phase shifting the sine wave signal by 90 degrees to generate a cosine wave signal. Sixth circuit means is responsive to the fourth signal, sine wave signal and cosine wave signal, for generating fifth and sixth signals both representative of average torque due to the pressures inside of the cylinders and of impulse torque due to the mass of the pistons and connecting rods. Seventh circuit means responsive to the third signal is provided for generating a seventh signal directly proportional to the square of the angular velocity of the engine. Eighth circuit means combines the fifth and sixth signals from the sixth circuit means with the seventh signal from the seventh circuit means to produce a resultant output signal directly proportional to the average torque and independent of speed with the effect of the inertia forces being cancelled.

BRIEF DESCRIPTION OF THE DRAWINGS

These and other objects and advantages of the present invention will become more fully apparent from the detailed description when read in conjunction with the accompanying drawings, wherein.

DESCRIPTION OF THE PREFERRED EMBODIMENT

As a background and in order to gain a full understanding of the present invention, there is required a discussion of the various parameters that are involved in the determination of torque for an internal combustion engine. For this invention, it is assumed that the engine is a four cylinder, two-cycle type. Thus, the implementation and operation of the invention to be described will necessitate an understanding of the following mathematical explanations and analysis.

Figure 1:
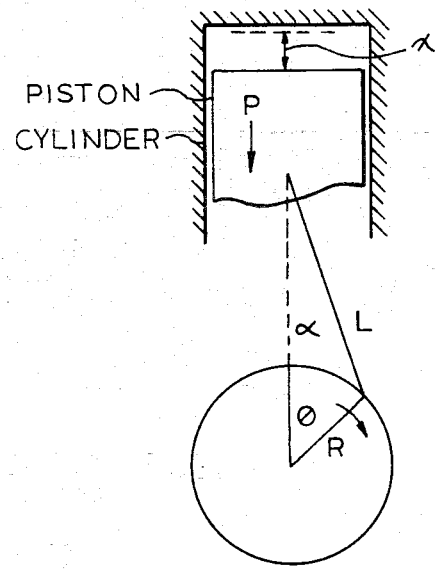
FIG. 1 illustrates a sketch showing the displacement of the piston as a function of the angular displacement of the crankshaft.

Initially, it is generally known that torque T of a crankshaft for an internal combustion engine is related to the angular position or displacement $\theta$ of the crankshaft and pressures P inside of the cylinders which exerts downward forces on the pistons. This is illustrated schematically in FIG. 1. Accordingly, the torque can be expressed mathematically as follows:

$$T = RPA \frac{\sin(\alpha + \theta)}{\cos\alpha} \quad \sin\alpha = \frac{R}{L} \sin\theta \quad \text{(a)}$$

wherein:
R is the throw of the crankshaft
L is the length of the connecting rod
P is the pressure inside of a cylinder
A is the area of the piston As a result, the total torque T due to the pressures inside of the four cylinders during the first cycle, the exhaust cycle, the intake cycle, and the compression cycle have been analytically determined to be as follows as a function of the angular displacement $\theta$ of the crankshaft and as adjusted for atmospheric pressure:

$$T = RA \left\{ (P_f(\theta) + P_{in}(\theta) - 30) \frac{\sin(\alpha + \theta)}{\cos\alpha} + (P_e + P_c - 30) \frac{\sin(\alpha - \theta)}{\cos\alpha} \right\} \quad \text{(b)}$$

wherein:
$P_f$ is the pressure during the firing cycle
$P_{in}$ is the pressure during the intake cycle
$P_e$ is the pressure during the exhaust cycle
$P_c$ is the pressure during the compression cycle However, it is also generally known that the force on the individual pistons independent of the pressure forces is not constant and thus causes the crankshaft to have velocity variations since there exists an inertia force due to the mass of the individual pistons and connecting rods. Heretofore, the prior attempts have failed to take into account these inertia forces. As can be seen from equation (b), these forces have been neglected in the calculation of the total torque T.

Referring again to FIG. 1, the inertia force $F_i(\theta)$ of the piston can be calculated to be as follows:

$$F_i(\theta) = M d^2x/dt^2 = MR\omega^2(\cos\theta + R/L \cos 2\theta) \quad \text{(c)}$$

wherein:
x = the displacement of the piston from top dead-center position = $L(1 - \cos\alpha) + R(1 - \cos\theta)$
$\theta$ = the angular displacement of the crankshaft
L = the length of the connecting rod
M = the mass of the piston $\sin\alpha = R/L \sin\theta$ $\omega = d\theta/dt =$ angular velocity of the crankshaft
$d^2x/dt^2 \simeq R\omega^2 \{R/L \cos 2\theta + \cos \theta\}$ assuming $L/R >> 1$ By dividing this inertia force $F_i(\theta)$ by the area A of the piston, an equivalent pressure term can be obtained which can be simply added to the torque equation (b) so as to take into account this inertia force. A multiplier factor of two is required because each term accounts for two pistons. Thus, the resultant torque equation is now as follows:

$$T = RA\left\{\left(P_f(\theta) + P_{in}(\theta) - 30 - \frac{2Fi(\theta)}{A}\right)\frac{\sin(\alpha + \theta)}{\cos \alpha} + \left(P_c(\theta) + P_c(\theta) - \frac{2Fi(180 + \theta)}{A}\right)\frac{\sin(\alpha - \theta)}{\cos \alpha}\right\} \quad (d)$$

Figure 2:
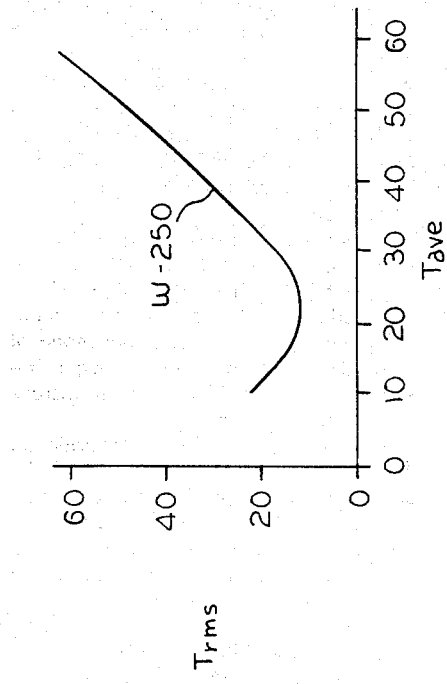
FIG. 2 is a graph showing the rms torque $T_{rms}$ as a function of the average torque $T_{ave}$ with speed as a parameter.

As is known to those skilled in the art, the root means square (RMS) value $T_{rms}$ of this torque equation may be plotted as a function of the average or indicated torque $T_{ave}$ with speed as a parameter. With the speed being approximately 250 radians/sec., the curve as shown in FIG. 2 is obtained. This analytical curve is identical to the same curve as is obtained due to actual measurements during experimentation. Therefore, this confirms that the torque expression in equation (b) is correct.

If we look only at the inertia terms $F_i(\theta)$ and $F_i(\theta + 180°)$, then the inertia torque term $T_i$ is as follows:

$$T_i = -2RA\left(F_i(\theta)\frac{\sin(\alpha + \theta)}{\cos \alpha} + F_i(\theta + 180)\frac{\sin(\alpha - \theta)}{\cos \alpha}\right) \quad (e)$$

Then by substituting $F_i(\theta)$ from equation (c) to equation (e), we have:

$$T_i = RA\left\{\begin{array}{l}-\frac{2MR\omega^2}{A}\left(\left(\cos\theta + \frac{R}{L}\cos 2\theta\right)\left(\frac{\sin\alpha\cos\theta + \cos\alpha\sin\theta}{\cos\alpha}\right)\right) \\ +\left(-\cos\theta + \frac{R}{L}\cos 2\theta\right)\left(\frac{\sin\alpha\cos\theta - \cos\alpha\sin\theta}{\cos\alpha}\right)\end{array}\right\} \quad (f)$$

where $\sin \alpha = \frac{R}{L}\sin \theta$ assuming $\cos \alpha = 1$

By simplifying we have the result:

$$T_i = RA\left\{\frac{-2MR\omega^2}{A}\left(\sin 2\theta + \frac{R^2}{L^2}\cos 2\theta \sin 2\theta\right)\right\} \quad (g)$$

As is known in the art, given that the crankshaft has some inertia, the time rate of change of the instantaneous velocity, which is acceleration, of the crankshaft is directly proportional to the instantaneous ac torque T or $$\frac{dv1}{dt} = KT \quad (h)$$

wherein:
$V_1$ is a voltage proportional to instantaneous velocity
K is a known constant It can be shown that when the torque T as shown in equation (d) above is expressed as a Fourier series, the coefficient of the sin $2\theta$ term will be proportional to the average torque $T_{ave}$.

Figure 4:
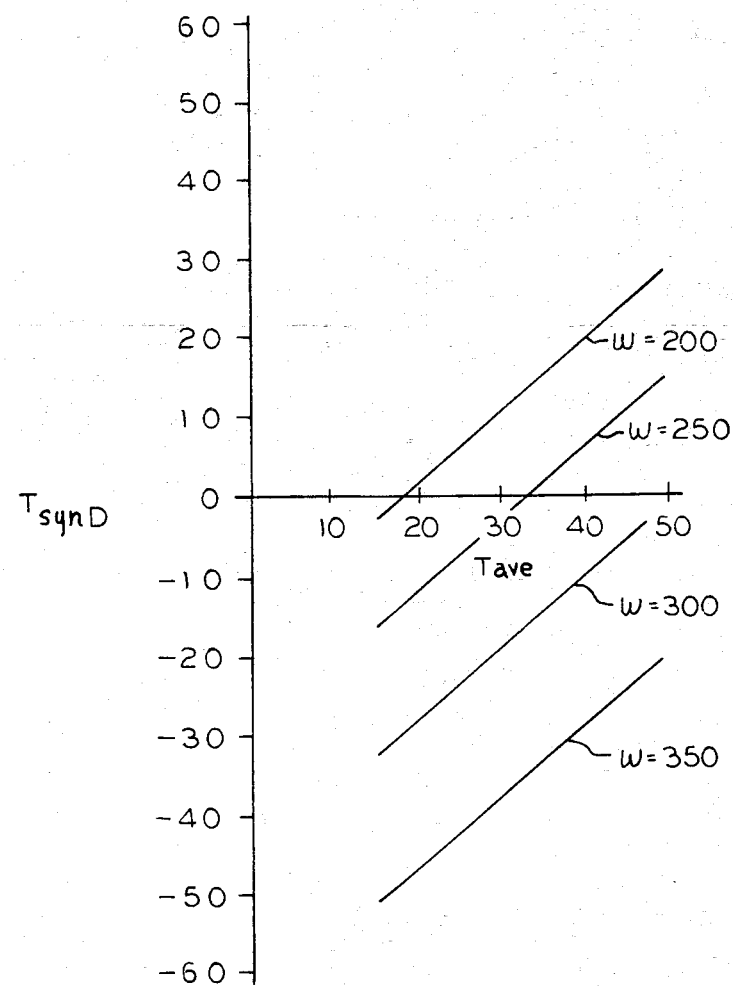
FIG. 4 is a graph showing the synchronous torque $T_{synD}$ as a function of the average torque $T_{ave}$.

In a two-cycle internal combustion engine with four cylinders, the torque wave form is repeated twice per revolution. Thus, by synchronous detection of the $dV_1/dt$ or acceleration signal over a one-half period $\theta/2$ or $\pi$ the resulting torque signal will be obtained. This can be expressed mathematically by:

$$T_{synD} = \int_0^\pi (T_p + T_i)\sin 2\theta d\theta + \int_0^\pi (T_p + T_i)\cos 2\theta d\theta \quad (i)$$

wherein:
T is the total torque
$T_p$ is the torque due to the pressures inside of the cylinders
$T_i$ is the torque due to the inertia forces from the mass of the pistons and connecting rods When the value of this equation (i) which is designated as $T_{synD}$ is plotted as a function of average Torque $T_{ave}$ the curve as shown in FIG. 4 is obtained.

Again looking only at the inertia torque term $T_i$, we have $$T^{(i)}_{synD} = \int_0^\pi T_i \sin 2\theta d\theta + \int_0^\pi T_i \cos 2\theta d\theta \quad (j)$$

By substituting $T_i$ from equation (g) into equation (j) we have $$T^{(i)}_{synD} = \quad (k)$$
$$-2MR^2\omega^2\left\{\frac{1}{\pi}\int_0^\pi \sin^2 2\theta d\theta + \frac{R^2}{\pi L^2}\int_0^\pi \cos 2\theta \sin^2 2\theta d\theta + \right.$$
$$\left.\frac{1}{\pi}\int_0^\pi \sin 2\theta \cos 2\theta d\theta + \frac{R^2}{\pi L^2}\int_0^\pi \cos^2 2\theta \sin 2\theta d\theta\right\}$$

By integrating and substitution of limits, we have $$T^{(i)}_{synD} = MR^2\omega^2 \quad (l)$$

Figure 5:
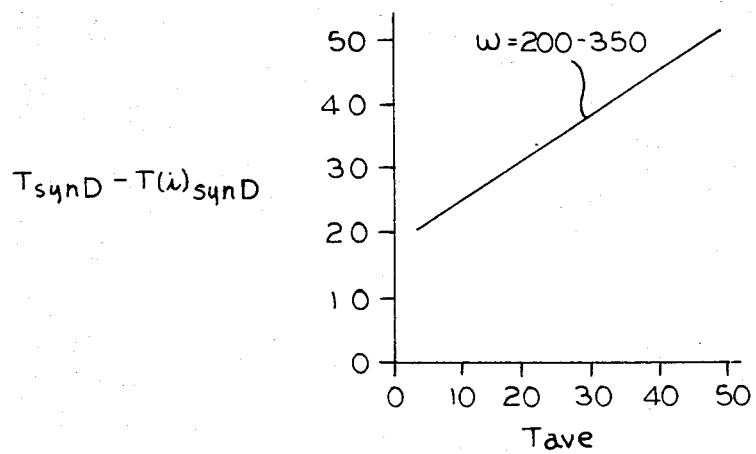
FIG. 5 is a graph showing the difference of the synchronous torque $T_{synD}$ and the synchronous impulse torque $T(i)_{synD}$ as a function of the average torque $T_{ave}$ which is independent of speed.

Therefore, if synchronous detection of the acceleration signal (which is directly proportional to the average torque $T_{ave}$) is performed and a term proportional to the square of the angular velocity $\omega^2$ is subtracted therefrom, a resultant output signal will be obtained which is directly proportional to torque and is independent of speed. This is shown in FIG. 5. This can be shown mathematically as follows:

$$V_o = K_1 T_{ave} + K_2\omega^2 - K_3\omega^2 \quad (m)$$

wherein:

$K_1$, $K_2$, and $K_3$ are known constants $T_{ave}$ is the torque due to the pressures of the cylinders $K_2$ is equal to $MR^2$ When $K_3$ is adjusted to be equal to $K_2$, we have simply $$V_o = K_1 T_{ave} \quad (n)$$

Figure 3:
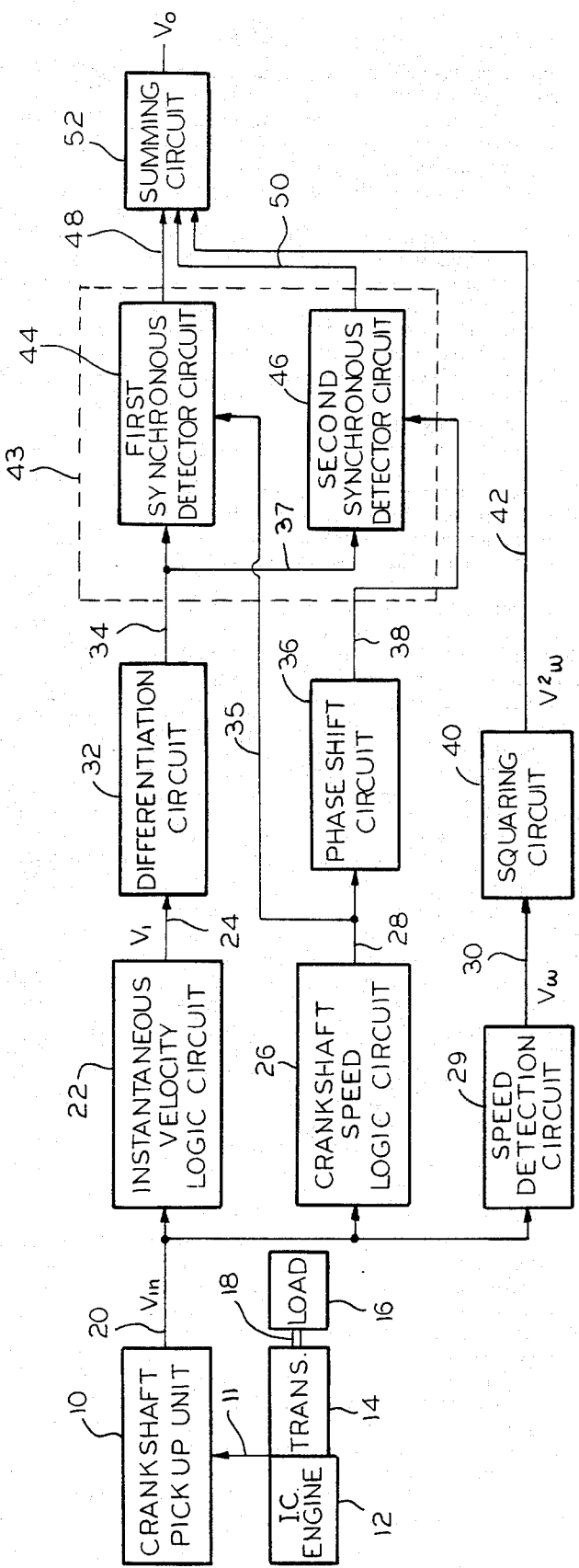
FIG. 3 is a block diagram of the torque measurement circuit according to the present invention.

Referring now in detail to FIG. 3 of the drawings, there is shown a preferred embodiment, in block diagram form, of a torque measurement circuit with speed correction of the present invention which performs and implements the above-discussed mathematical explanations. All of the blocks represent electronic circuits of a conventional nature and may take on various forms as is well known to those skilled in the art. The measurement circuit includes a crankshaft pick-up unit 10 which receives input signals via line 11 indicative of the angular position of a rotating member of a prime mover 12 so as to detect and measure the rotational speed thereof. When the rotating member is the crankshaft of an internal combustion engine, the pick-up unit 10 produces a series of repetitive pulsed signal outputs which are directly proportional to the rotational speed of the crankshaft. As is shown directly beneath the pick-up unit 10, the prime mover 12 takes the form of a conventional internal combustion engine of the type normally found in automotive vehicles and has a transmission 14 which is coupled to a driven load 16 via a shaft 18. The internal combustion engine is preferably of the four cylinder, two-cycle type. The pick-up unit 10 may take many forms such as electrical, electronic, magnetic and electro-mechanical and optical methods. For example, the pick-up unit may consist of a toothed disc having teeth of soft magnetic material separated by areas with no material, and a magnetic device of a conventional type for detecting the presence of each tooth so as to generate the pulsed signal outputs.

An input signal on line 11 indicative of the angular position $\theta$ of the crankshaft of the engine is fed to the pick-up unit 10. The pulsed signal outputs from the pick-up unit 10 on line 20 is designated as $V_{in}$. $V_{in}$ is a pulsed voltage waveform whose frequency is directly proportional to the rotational speed of the crankshaft and is also indicative of when the piston is at top dead-center. This $V_{in}$ signal is fed to an instantaneous velocity logic circuit 22 which generates a d.c. output voltage $V_1$ on line 24 that is directly proportional to the instantaneous rotational velocity of the engine. The $V_{in}$ signal is also coupled to a crankshaft speed logic circuit 26 which generates a sinusoidal wave output signal on line 28 that is the sine of twice the angular displacement $\theta$ of the crankshaft or $\sin 2\theta$. The sinusoidal wave is caused to be initiated when the piston is at top dead-center position or $\theta = 0°$ during the firing cycle. The $V_{in}$ signal is further delivered to a speed detector circuit 29 such as a tachometer to generate a d.c. output signal $V\omega$ on line 30 which is directly proportional to the average angular velocity $\omega$ of the engine.

The voltage $V_1$ proportional to the instantaneous rotational velocity is fed to a differentiation circuit 32 which performs the mathematical operation of differentiating the voltage $V_1$ to yield an output signal on line 34 equal to the time rate of change of the voltage $V_1$ or $dV_1/dt$ and represents the angular acceleration of the engine. This signal on line 34 is also proportional to the total instantaneous ac torque T of the engine which has been shown by equation (h) discussed above. The output signal on line 28 is delivered to a phase shift circuit 36 which generates an output signal on line 38. This signal on line 38 is shifted 90 degrees from its input to yield a sinusoidal wave of $\cos 2\theta$. The output signal $V\omega$ on line 30 proportional to the average angular velocity is coupled to a squaring circuit 40 which generates an output signal $V\omega^2$ on line 42 proportional to the square of the angular velocity or $\omega^2$.

The synchronous detector means 43 comprises a first synchronous detector 44 and a second synchronous detector circuit 46. The synchronous detector means 43 performs the mathematical operation as shown in equation (i) discussed above to yield the output signal $T_{synD}$ on lines 48 and 50. The output on line 48 is equal to the first term of the equation (i), and the output on line 50 is equal to the second term of the equation (i). As can be seen, the first synchronous detector circuit 44 receives a first input from the line 34 which is proportional to torque T and a second input from the line 35 which is proportional to $\sin 2\theta$. The second synchronous detector circuit 46 receives a first input from line 37 which is also proportional to torque T and a second input signal from line 38 which is proportional to $\cos 2\theta$. The synchronous detector means 44 multiples the torque signal T with $\sin 2\theta$ and integrates the product over a one-half period $\pi$. Thus, this corresponds to the first term of the equation (i). Similarly, the synchronous detector circuit 46 multiplies the torque signal T with $\cos 2\theta$ and integrates the product over a one-half period $\pi$. This corresponds to the second term of the equation (i).

A summing circuit 52 combines the synchronous torque or $T_{synD}$ signal on lines 48 and 50 with the output signal $V\omega^2$ on line 42 which is proportional to $\omega^2$ in order to generate a resultant output signal $V_o$ proportional to torque and independent of speed as shown in equation (n). The first term of the equation (m) represents the results of a mathematical operation performed on $T_p$ from equation (i) which is due to the pressures inside the cylinders. The second term of the equation (m) represents the results of the mathematical operation performed on $T_i$ from equation (i) which is the inertia forces due to the mass of the pistons and connecting rods. The third term of the equation (m) represents the output from the squaring circuit 40 on line 42. Thus, when the known constant $K_3$ is made to be equal to the constant $K_2$, the output signal $V_o$ is simply equal to $K_1 T_{ave}$.

From the foregoing detailed description, it can thus be seen that the present invention provides an improved torque measurement circuit and method for an internal combustion engine of the four cylinder, two-cycle type which cancels an error created by inertia impulse forces due to the mass of the pistons and connecting rods. The torque measurement circuit includes synchronous detector means driven at twice the rotational velocity of the crankshaft of the engine to produce a synchronous detection signal directly proportional to torque which is the sum of first and second signals both representative of the pressures inside the cylinders and of inertia forces due to mass of the pistons and connecting rods.

A summing means is provided for combining the synchronous signal with a signal directly proportional to the square of the engine's average angular velocity to produce a resultant output proportional to the average torque and independent of the engine's speed with the effects of the inertial forces being cancelled.

While there has been illustrated and described what is at present to be a preferred embodiment of the present invention, it will be understood by those skilled in the art that there are changes and modifications that may be made, and equivalents may be substituted for elements thereof without departing from the true scope thereof. In addition, many modifications may be made to adapt a particular situation or material to the teachings of the present invention without departing from the central scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A torque measurement circuit for an internal combustion engine of the four cylinder, two-cycle type which accounts for inertia forces due to the mass of the pistons and connecting rods, said circuit comprising:
   pick-up means having an input indicative of the angular displacement of the crankshaft in an internal combustion engine from top dead-center position for generating a first signal directly proportional to the rotational speed of the crankshaft, said first signal having a portion indicative of when the piston is at top dead-center position;
   first circuit means responsive to said first signal proportional to the rotational speed for generating a second signal directly proportional to the engine's instantaneous rotational velocity;
   second circuit means responsive to said portion of said first signal indicative of when the piston is at top dead-center position for generating a sine wave signal at twice the angular displacement of the crankshaft;
   third circuit means also responsive to said portion of said first signal for generating a third signal directly proportional to the engine's average angular velocity;
   fourth circuit means for differentiating said second signal to generate a fourth signal directly proportional to angular acceleration;
   fifth circuit means responsive to said sine wave signal for phase shifting said sine wave signal by 90 degrees for generating a cosine wave signal;
   sixth circuit means responsive to said fourth signal proportional to acceleration, sine wave signal, and cosine wave signal for generating fifth and sixth signal both representative of average torque due to pressures inside of the cylinders and of impulse torque due to the mass of the pistons and connecting rods;
   seventh circuit means responsive to said third signal for generating a seventh signal directly proportional to the square of the engine's average angular velocity; and
   eighth circuit means for combining said fifth and sixth signals from said sixth circuit means with said seventh signal from said seventh circuit means to produce a resultant output signal proportional to the average torque and independent of the engine's speed with the effects of inertia forces being cancelled.

2. A torque measurement circuit as claimed in claim 1, wherein said pick-up means is a crankshaft pick-up unit.

3. A torque measurement circuit as claimed in claim 1, wherein said first circuit means is an instantaneous velocity logic circuit.

4. A torque measurement circuit as claimed in claim 1, wherein said second circuit means is a crankshaft speed logic circuit.

5. A torque measurement circuit as claimed in claim 1, wherein third circuit means is a speed detector circuit.

6. A torque measurement circuit as claimed in claim 5, wherein said speed detector circuit includes a tachometer.

7. A torque measurement circuit as claimed in claim 1, wherein said fourth circuit means is a differentiation circuit.

8. A torque measurement circuit as claimed in claim 1, wherein said fifth circuit means is a phase shift circuit.

9. A torque measurement circuit as claimed in claim 1, wherein said sixth circuit means comprises first and second synchronous detector circuits.

10. A torque measurement circuit as claimed in claim 9, wherein said first synchronous detector circuit performs the mathematical operation of multiplying the fourth signal with said sine wave signal and then integrates the product over a one-half period, and wherein said second synchronous detector circuit performs the mathematical operation of multiplying the fourth signal with said cosine wave signal and then integrates the product over a one-half period.

11. A torque measurement circuit as claimed in claim 9, wherein said first and second synchronous detector circuits perform the mathematical expression of:

$$\int_o^\pi T \sin 2\theta d\theta + \int_o^\pi T \cos 2\theta d\theta$$

12. A torque measurement circuit as claimed in claim 1, wherein said seventh circuit means is a squaring circuit.

13. A torque measurement circuit as claimed in claim 1, wherein said eighth circuit means is a summing circuit.

14. A torque measurement circuit as claimed in claim 1, wherein said first signal is a pulsed output signal.

15. A torque measurement circuit as claimed in claim 1, wherein said second signal is a d.c. voltage.

16. A torque measurement circuit as claimed in claim 1, wherein said third signal is a d.c. voltage.

17. A torque measurement circuit as claimed in claim 1, wherein said resultant output signal is equal to $k_1 T_{ave} + k_2 \omega^2 - k_3 \omega^2$, the first term being representative of said fifth signal, the second term being representative of said sixth signal, and the third term being representative of said seventh signal.

18. A torque measurement circuit as claimed in claim 17, wherein said resultant output signal is equal to $k_1 T_{ave}$ when $k_2$ is equal to $k_3$.

19. A method for measuring torque of an internal combustion engine of the four cylinder, two-cycle type which accounts for inertia forces due to the mass of the pistons and connecting rods, said method comprising the steps of:
   generating a first signal directly proportional to the rotational speed of the crankshaft of an internal combustion engine, said first signal having a portion indicative of when the piston is at top dead-center position;

generating a second signal directly proportional to the engine's instantaneous rotational velocity in response to the first signal;

initiating a sine wave signal at twice the angular displacement of the crankshaft when the piston is at top dead-center position in response to the portion of the first signal;

generating a third signal directly proportional to the engine's average angular velocity in response to the portion of the first signal;

differentiating the second signal to generate a fourth signal directly proportional to the angular acceleration or torque of the engine;

phase shifting the sine wave signal by 90 degrees for generating a cosine wave signal;

generating from the fourth signal proportional to torque, the sine wave signal and the cosine wave signal fifth and sixth signals both representative of average torque due to pressures inside of the cylinders and of impulse torque due to a mass of the pistons and connecting rods;

generating a seventh signal directly proportional to the square of the engine's average angular velocity in response to the third signal; and summing the fifth and sixth signals with the seventh signal to produce a resultant output signal proportional to the average torque and independent of the engine's speed with the effects of the inertia forces being cancelled.

20. A method for measuring torque of an internal combustion engine, said method comprising the steps of:

generating a signal directly proportional to the rotational speed of the cranshaft of an internal combustion engine;

generating a sine wave signal at twice the angular displacement of the crankshaft;

generating a signal directly proportional to the angular velocity of the crankshaft;

differentiating the signal proportional to the rotational speed to provide a signal directly proportional to torque variations;

phase shifting the sine wave signal by 90 degrees to produce a cosine wave signal;

squaring the signal proportional to the angular velocity to produce a signal directly proportional to the square of the angular velocity;

synchronously detecting the torque signal with the sine and cosine wave signals to produce a synchronous detection signal; and summing the synchronous detection signal with the signal proportional to the square of the angular velocity to produce a resultant output signal directly proportional to average torque and independent of speed.

* * * * *

UNITED STATES PATENT OFFICE
CERTIFICATE OF CORRECTION

PATENT NO. : 4,550,595

DATED : November 5, 1985

INVENTOR(S) : HARRY J. VENEMA

It is certified that error appears in the above-identified patent and that said Letters Patent are hereby corrected as shown below:

Column 4, line 30, cancel "first" and insert -- firing --.

IN THE ABSTRACT - line 3, cancel "two-cycle" and insert -- four-cycle --.
Column 1, lines 9 and 10, cancel "two-cycle" and insert -- four-cycle --.
Column 2, lines 63 and 64, cancel "two-cycle" and insert -- four-cycle --.
Column 3, line 11, cancel "two-cycle" and insert -- four-cycle --.
Column 4, line 9, cancel "two-cycle" and insert -- four-cycle --.
Column 6, line 3, cancel "two-cycle" and insert -- four-cycle --.
Column 7, line 31, cancel "two-cycle" and insert -- four-cycle --.
Column 8, line 53, cancel "two-cycle" and insert -- four-cycle --.

UNITED STATES PATENT AND TRADEMARK OFFICE
CERTIFICATE OF CORRECTION

PATENT NO.  :  4,550,595

DATED       :  November 5, 1985

INVENTOR(S) :  HARRY J. VENEMA

It is certified that error appears in the above-identified patent and that said Letters Patent is hereby corrected as shown below:

Column 9, line 19, cancel "two-cycle" and insert
              -- four-cycle --.

Column 10, line 60, cancel "two-cycle" and insert
              -- four-cycle --.

Signed and Sealed this

Eighteenth Day of March 1986

[SEAL]

Attest:

DONALD J. QUIGG

Attesting Officer

Commissioner of Patents and Trademarks